United States Patent [19]

Pruitt

[11] Patent Number: 4,755,225
[45] Date of Patent: Jul. 5, 1988

[54] CELLULOSIC-BASED PARTICULATE INSULATION AND METHOD OF MANUFACTURING SAME

[76] Inventor: Norman W. Pruitt, 3501 Launcelot Way, Annandale, Va. 22003

[21] Appl. No.: 769,067

[22] Filed: Aug. 26, 1985

[51] Int. Cl.$^4$ .............................................. C09D 5/14
[52] U.S. Cl. .................................. 106/15.05; 162/159; 162/166; 162/181.2; 252/62; 252/607
[58] Field of Search ...................................... 106/15.05

[56] References Cited

U.S. PATENT DOCUMENTS 4,519,918  5/1985  Ericsson et al. ..................... 210/924
4,537,877  8/1985  Ericsson .............................. 210/924

FOREIGN PATENT DOCUMENTS 46-009659  3/1971  Japan .

Primary Examiner—A. Lionel Clingman
Attorney, Agent, or Firm—A. W. Breiner

[57] ABSTRACT

Flame and combustion retardant insulative materials are manufactured by subjecting cellulosic pulp rejects to a dewatering operation to remove approximately 25% of the water; flash-drying the obtained partially dewatered rejects, causing the rejects to expand and become porous; applying a flame or combustion retardant material to impregnate and coat the expanded and porous cellulosic material, and drying. The thus impregnated and coated cellulosic materials have high insulative values while being highly resistant to flame and smoldering combustion.

13 Claims, 1 Drawing Sheet

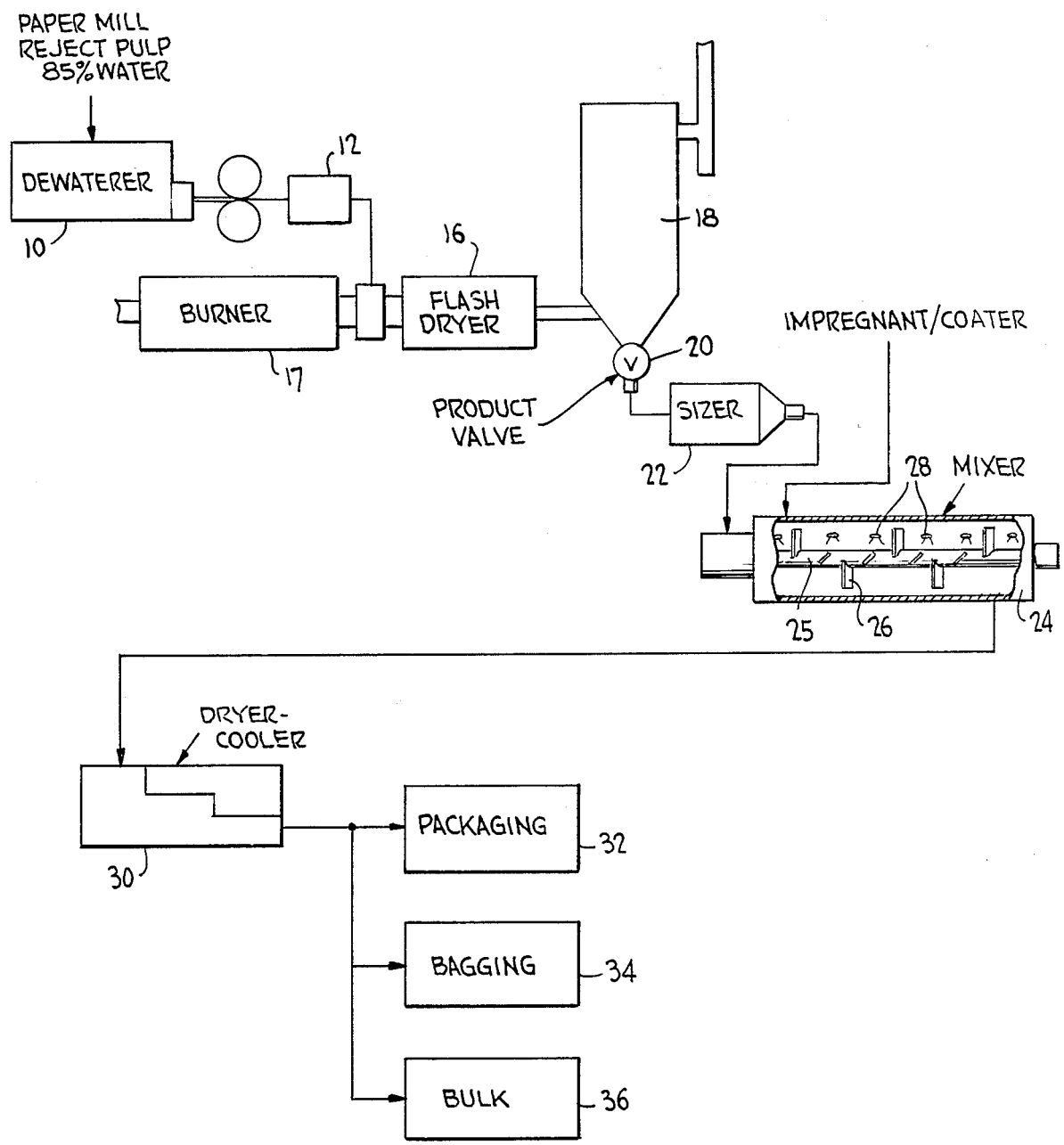

CELLULOSIC-BASED PARTICULATE INSULATION AND METHOD OF MANUFACTURING SAME

FIELD OF INVENTION AND BACKGROUND

The present invention is directed to an improved insulation. More particularly, the invention is directed to an expanded, porous, cellulosic material impregnated with or coated with a flame and combustion retardant material, and to its process of manufacture.

Due to the high cost of energy, the need for an inexpensive, easy to install, effective insulation has led to substantial research and development. As a result of this research and development, highly effective insulations have been made available. However, there is still a need for improved insulations which can be easily installed or applied, and which are inexpensive but still highly effective from the standpoint of insulative value while being flame and combustion retardant.

OBJECTS AND GENERAL DESCRIPTION OF THE INVENTION

Accordingly, it is a primary object of the present invention to provide an insulative material which is low in cost.

It is another primary object of the present invention to provide an insulative material which is low in cost while being resistant to flame and combustion.

It is another object of the present invention to provide an insulative material which is particulate in form, permitting its application by blowing or the like; and which is low in cost while having high insulative and fire retardant values.

It is another primary object of the present invention to provide an improved method of making an insulative material which is low in cost and which has good insulative and fire retardant values.

These and other objects of the invention will become apparent from the following general description of the invention, the illustrative drawing, and presently preferred detailed embodiment.

According to the present invention, cellulosic pulp rejects from a pulpmill are partially dewatered; flash-dried to cause the rejects to expand and become porous, and thereafter a flame or combustion retardant material is applied to the expanded porous cellulosic rejects. The coated or impregnated cellulosic material has excellent insulation properties and is resistant to flame and smoldering combustion.

The cellulosic pulp rejects used according to this invention are recovered from a pulpmill in a water slurry as an inexpensive waste or by-product. These rejects comprise cellulosic fibers which are separated from the main body of pulp during the treatment of the pulp in the papermaking process. These reject fibers are carried in large volumes of water, for example 5% fiber and 95% water. The fibers are separated from the water using filtration means. The separated cellulosic fibers in the form of lumps or clumps of fibers, commonly referred to as "rejects," still contain up to about 85% water. The rejects are dewatered to remove a part of the water. The partly dewatered pulp rejects are then flash-dried, which breaks up the lumps or clumps of fibers into small particles, and expands and renders the rejects porous. In order to get adequate expansion and porosity, it is essential that the cellulosic pulp rejects at the time of flash-drying contain from about 40 to 70% water. The flash-drying is carried out in a conventional louvered rotary dryer such as a Heil or Aeroglide dryer at a temperature of from about 400° to 700° F. The high temperature causes the water on and in the cellulosic rejects to rapidly vaporize, causing the rejects to expand and "explode," providing the desired porosity in the cellulosic particles. It has been found that these cullulosic particles have high insulative value and are light in weight, allowing the particles to be blown into spaces such as in an attic of a house or between walls for insulative purposes. Additionally, it was discovered that the cellulosic particles are not flammable, but will burn with a punking-type action. It was further discovered that when the particles are coated or impregnated, for example in a blender, with a flame or combustion retardant material the particles become highly resistant to flame and even smoldering combustion. The coating or impregnation does not substantially modify the cellulosic particles.

The flame or combustion retardant material for application to the cellulosic carrier can be virtually any material having flame or combustion retardant properties and which is compatible with or which can be made compatible with the cellulosic rejects. Cellulosic rejects in water are hydrophilic and, therefore, will accept any naturally hydrophilic additive material or material which has been treated, for example, with a surfactant to provide compatibility. Alternatively, the cellulosic rejects can be treated to render them hydrophobic. The surfactants which are useful include the nonionic, anionic, and cationic surfactants. The selected surfactant depends in part upon the flames or combustion retardant material to be utilized. Suitable flame or combustion retardant materials include inorganic compounds that contain varying percentages of chlorine and/or bromine, phosphorus, combinations of halogen and phosphorus, and substances such as antimony oxide, hydrated alumina, and compounds containing boron. These materials can be applied to the cellulosic reject materials, for example in a blender, as a liquid for impregnation and coating of the cellulosic material. It may be desirable, particularly when the material is in dispersed or particulate form, to add the flame combustion retardant material when incorporated in an adhesive material to obtain better adherence of the coating. It has also been found that urea and melamine provide good flame and fire retardant characteristics, including resistance to smoldering combustion. The flame retardant material should be present in an amount sufficient to coat or impregnate the surface of the cellulosic material. Normally the flame or combustion retardant material need not be present in more than about 5% by volume of the cellulosic material. However, as will be apparent, the flame or combustion retardant material can be present in an amount up to about 40% by volume of the cellulosic material without adversely influencing the porosity and insulative value of the cellulosic particles.

DRAWING AND PRESENTLY PREFERRED EMBODIMENT

Having described the invention in general terms, a presently preferred and detailed embodiment will be set forth with reference to the drawing.

In the drawing, the sole FIGURE is a flow diagram of the process for manufacturing the insulative material of the present invention.

As illustrated in the drawing, papermill reject pulp comprising about 85% water is subjected to a dewatering operation in dewaterer 10 to remove approximately 25% of the total water. Accordingly, the cellulosic rejects after dewatering will contain about 60% total water content. The dewaterer in the embodiment shown comprises a continuously moving web having in association therewith first a pressure roller, a spider mixer, and then a second pressure roller.

Also in the embodiment shown, pulp sizer and conditioner 12 is utilized to treat the dewatered pulp with a nonionic surfactant before flash-drying. A suitable nonionic surfactant is an ethylene oxide derivative of nonylphenol. The conditioned dewatered pulp is then fed to a flash dryer 16 where the cellulose is subjected to a temperature of from about 400° to 700° F., at which temperature the water contained in the reject pulp is rapidly volatilized, expanding the pulp reject and rendering the pulp porous. The flash dryer utilized in the embodiment illustrated is a conventional dryer having a gas burner 17 which permits rapid heating and also rapid heat dissipation.

The flash-dried cellulose rejects are then fed to a cyclone storage bin 18 for storage until the materials are to be impregnated or coated. The expanded cellulose is fed from bin 18 through product valve 20 to a sizer 22 where the cellulosic particles are properly sized. It is usually desirable that all of the particles for a particular application have the same size within about a 20% range. Thus, depending upon the end application of the insulation, one particle size may be preferable over another. It has been found that a preferred size for attic insulation is such that the cellulosic material will pass through a Tyler Standard Mesh of 8 to 4. This mesh corresponds to a 3/32 to 3/16 of an inch particle.

After the sizing and separation of the different sizes, depending upon the application, the cellulosic carrier is fed to a blender. In making the insulation, particles having a size of 3/32 to 3/16 of an inch in diameter are fed to blender or mixer 24 and kept in continuous motion with an auger 25 having baffles 26. While in continuous motion, the cellulosic particles are sprayed with an aqueous mixture of 20% by weight melamine. As illustrated and in the preferred embodiment, a plurality of sprayers 28—such as air sprayers having adjustable valves to control the supply of air entering the mixing chamber within the sprayer where air and the flame retardant are blended—are arranged along the top or side of the blender. After being coated and impregnated and continuously mixed, the coated and impregnated cellulosic fibers are fed to a dryer-cooler 30, and from the dryer-cooler 30 either to a packaging facility 32, a bagging facility 34, or to bulk storage 36.

The compositions of this invention have excellent insulative properties primarily due to the expanded porous nature of the cellulosic materials. Additionally, the compositions have good resistance to termite and other vermin, and are resistant to mildew. Further, the compositions have good structural integrity.

As will be apparent to one skilled in the art, various modifications can be made within the scope of the aforesaid description. Such modifications being within the ability of one skilled in the art form a part of the present invention and are embraced by the appended claims.

It is claimed:

1. A flame and combustion retardant insulation comprising particulate cellulosic pulp rejects which have been expanded and rendered porous by flash-drying pulp rejects having a water content of from about 40 to 70% at a temperature of from about 400° to 700° F., impregnated or coated with up to about 40% of the flash-dried volume of said rejects with a flame or combustion retardant material.

2. The composition of claim 1 wherein said rejects include a surfactant applied thereto prior to flash-drying.

3. The composition of claim 1 wherein said flame or combustion retardant material is urea.

4. The composition of claim 3 wherein said flame or combustion retardant material is melamine.

5. The composition of claim 1 wherein said flame or combustion retardant material is chlorine containing.

6. The composition of claim 1 wherein said flame or combustion retardant material is phosphorus containing.

7. The method of manufacturing a flame or combustion retardant insulation comprising the steps of (1) providing a cellulosic reject pulp having from about 40 to 70% water; (2) flash-drying said reject cellulosic pulp at a temperature of from about 400° to 700° F. to expand and render said particulate rejects porous; (3) impregnating or coating said expanded cellulosic pulp with a flame or combustion retardant material; and (4) drying.

8. The method of manufacture of claim 7 including the step of treating said cellulosic pulp reject before flash-drying with a surfactant.

9. The method of claim 7 wherein said impregnation or coating is with a blender.

10. The method of claim 7 wherein said flame or combustion retardant material is melamine.

11. The method of claim 1 wherein said flame or combustion retardant material is urea.

12. The method of claim 1 wherein said flame or combustion retardant material is chlorine containing.

13. The method of claim 1 wherein said flame or combustion retardant material is phosphorus containing.

* * * * *